(12) United States Patent
Bateham et al.

(10) Patent No.: US 11,364,549 B2
(45) Date of Patent: Jun. 21, 2022

(54) FIXTURES FOR WORKING AIRCRAFT COMPONENTS AND METHODS FOR THE SAME

(71) Applicant: Gulfstream Aerospace Corporation, Savannah, GA (US)

(72) Inventors: Jason Bateham, Savannah, GA (US); Gloria King, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 15/929,273

(22) Filed: Apr. 21, 2020

(65) Prior Publication Data

US 2020/0247560 A1 Aug. 6, 2020

Related U.S. Application Data

(62) Division of application No. 15/674,457, filed on Aug. 10, 2017, now Pat. No. 10,669,043.

(51) Int. Cl.
*B23B 47/28* (2006.01)
*B64F 5/10* (2017.01)
*B23B 35/00* (2006.01)

(52) U.S. Cl.
CPC .............. *B23B 47/28* (2013.01); *B23B 35/00* (2013.01); *B23B 2215/04* (2013.01); *B64F 5/10* (2017.01)

(58) Field of Classification Search
CPC ... B23B 47/28; B23B 47/282; B23B 2247/12; B23B 2247/14; B23B 2247/00;

(Continued)

(56) References Cited

U.S. PATENT DOCUMENTS 2,539,130 A 2/1882 Davis
397,311 A * 2/1889 Schott ..................... B23B 47/28
408/79

(Continued)

FOREIGN PATENT DOCUMENTS

DE 342598 C * 10/1921 ................ B25B 1/22
DE 29519745 U1 * 3/1996 .............. B23B 47/28

(Continued)

OTHER PUBLICATIONS

Description DE102005001348A1 (translation) obtained at https://worldwide.espacenet.com/ (last visited Feb. 26, 2021).*

*Primary Examiner* — Ryan Rufo
(74) *Attorney, Agent, or Firm* — LKGlobal | Lorenz & Kopf, LLP

(57) ABSTRACT

Ribs for working an aircraft component having an aircraft component surface, fixtures for the same, and methods for the same, are provided herein. The rib includes a rib surface configured to receive the aircraft component and to be in abutting contact with at least a portion of the aircraft component surface. The rib further includes an extension extending away from the rib and configured to couple to a worksurface. Orientation of the rib is configured to be adjustable relative to the worksurface for improving working of the aircraft component. The fixture includes a mount defining an aperture and configured to be coupled to the worksurface and the rib. The method includes providing the fixture including the rib. The method further includes coupling the extension to a worksurface. The method further includes disposing the aircraft component on the rib surface.

13 Claims, 5 Drawing Sheets

(58) Field of Classification Search
CPC ..... B64F 5/10; B25B 1/22; B25B 1/20; B25B 11/02; B25B 11/00; B23Q 3/067; Y10T 408/5619
See application file for complete search history.

(56) References Cited

U.S. PATENT DOCUMENTS

| | | | |
|---|---|---|---|
| 776,553 A * | 12/1904 | Scoggins | B25B 1/22 |
| | | | 269/69 |
| 1,318,688 A | 10/1919 | Paschall | |
| 1,369,707 A * | 2/1921 | Reilly | B23Q 1/545 |
| | | | 269/75 |
| 1,440,167 A | 12/1922 | Ober | |
| 1,611,305 A | 12/1926 | Ellwood, Sr. | |
| 1,737,719 A | 12/1929 | Hipperson et al. | |
| 2,106,525 A | 1/1938 | Henry | |
| 2,352,699 A | 7/1944 | Ennis | |
| 2,431,594 A * | 11/1947 | Wernig | B23Q 3/067 |
| | | | 408/87 |
| 2,619,858 A * | 12/1952 | Starbuck | B25B 1/2405 |
| | | | 269/246 |
| 3,465,619 A | 9/1969 | Blaker et al. | |
| 3,782,847 A | 1/1974 | Kulzer | |
| 3,815,892 A | 6/1974 | Tulk | |
| 4,632,375 A | 12/1986 | Yang | |
| 4,976,484 A | 12/1990 | Nomaru | |
| 5,069,433 A | 12/1991 | Womack | |
| 5,249,785 A | 10/1993 | Nelson et al. | |
| 5,318,394 A | 6/1994 | Pierce | |
| 5,462,294 A * | 10/1995 | Wendhack | B23Q 3/067 |
| | | | 269/88 |
| 5,507,605 A | 4/1996 | Bae | |
| 5,564,681 A | 10/1996 | Glass | |
| 5,738,344 A | 4/1998 | Hagman | |
| 5,957,445 A | 9/1999 | Hagman | |
| 6,032,938 A * | 3/2000 | Jones | B25B 1/22 |
| | | | 269/64 |
| 6,551,428 B1 | 4/2003 | Gregoire et al. | |
| 6,598,866 B2 | 7/2003 | Helm et al. | |
| 6,637,738 B1 | 10/2003 | Beaudet | |
| 7,584,947 B2 | 9/2009 | Freeland | |
| 7,765,130 B2 | 7/2010 | McQueen, III et al. | |
| 2005/0142926 A1* | 6/2005 | Kahl | B25B 5/006 |
| | | | 439/418 |
| 2008/0084012 A1 | 4/2008 | Baumann et al. | |
| 2009/0302517 A1 | 12/2009 | Patel | |
| 2010/0260569 A1 | 10/2010 | Ham | |
| 2015/0202693 A1* | 7/2015 | Huang | B23Q 3/067 |
| | | | 279/42 |

FOREIGN PATENT DOCUMENTS

| | | | | |
|---|---|---|---|---|
| DE | 10124927 A1 * | 12/2002 | | B25B 1/22 |
| DE | 102005001348 A1 * | 7/2006 | | F16C 11/106 |
| DE | 102014009925 A1 | 12/2014 | | |
| EP | 0104286 A1 | 4/1984 | | |
| FR | 2424106 A1 * | 11/1979 | | B23Q 1/5412 |
| GB | 1170986 A * | 11/1969 | | B25B 5/14 |
| GB | 2345656 A * | 7/2000 | | B25B 1/22 |
| WO | WO-2015118180 A1 * | 8/2015 | | B25B 1/2421 |

* cited by examiner

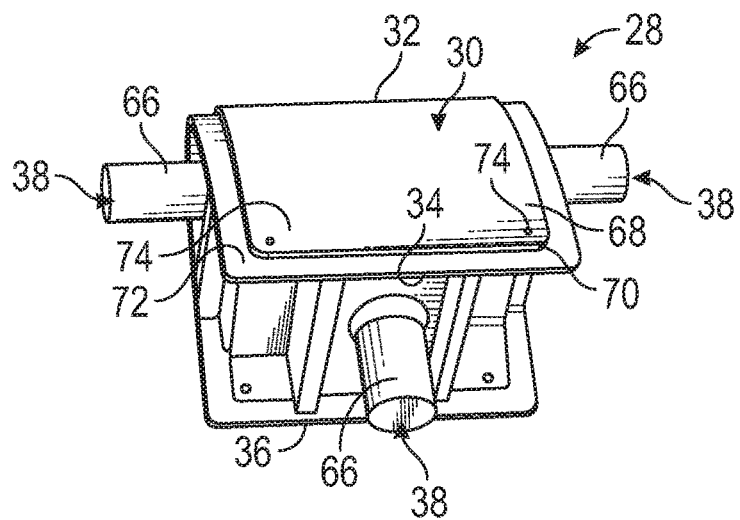
FIG. 3
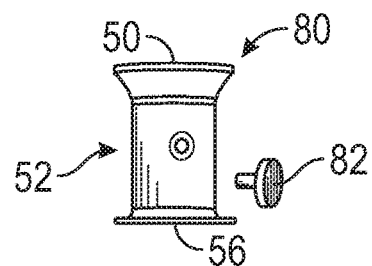
FIG. 4
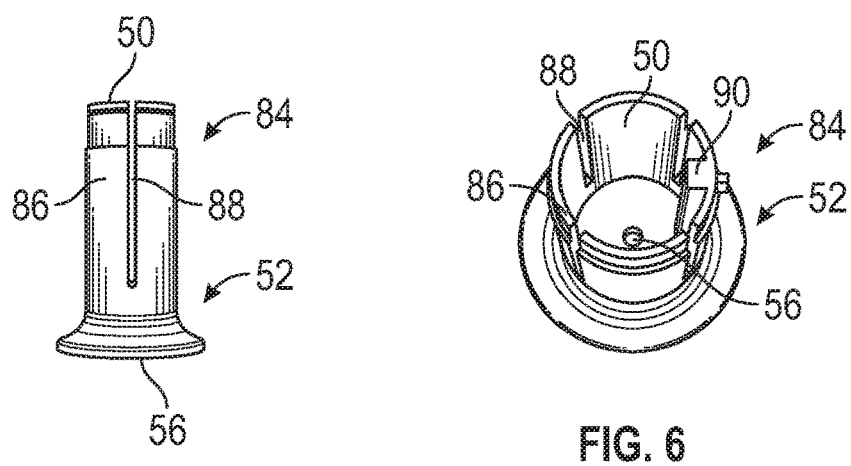
FIG. 5
FIG. 6

FIXTURES FOR WORKING AIRCRAFT COMPONENTS AND METHODS FOR THE SAME

CROSS-REFERENCE TO RELATED APPLICATION(S)

This application is a Divisional of U.S. application Ser. No. 15/674,457 which was filed on Aug. 10, 2017, entitled "FIXTURES FOR WORKING AIRCRAFT COMPONENTS AND METHODS FOR THE SAME," which is incorporated herein by reference in its entirety.

TECHNICAL FIELD

The present invention generally relates to vehicles and more particularly relates to aircraft manufacturing, testing, and maintenance.

BACKGROUND

Aircraft components, such as a Gap band for a wing of an aircraft, undergo working prior to installation on the aircraft. Gap bands include a sharp apex that presents challenges during working of the Gap band. Working of the Gap band can include forming countersunk pilot holes that are utilized for attachment of the Gap band to the aircraft. The convention process for forming countersunk pilot holes can be a manual process performed by a technician. The conventional process can include boring pilot holes in the Gap band utilizing a drill and countersinking the pilot holes utilizing spin forming. However, due to the sharp apex of the Gap band, inconsistent and defect-prone countersunk pilot holes regularly occur during the process such that the Gap band is deemed as scrap.

Several factors can contribute to the quality of the countersunk pilot holes formed in the Gap band including dimensional tolerance of the countersink, flexibility of the material, height of the Gap band relative to height of the technician performing the countersink process, and skill of the technician performing the countersink process. As one example, a Gap band including 38 pilot holes about a perimeter of the Gap band requires twisting, turning, and bending of the technician's body to countersink each of the pilot holes. This maneuvering of the technician's does not only lack ergonomics, but the technician cannot reach a proper position to utilize the tool effectively for forming the countersink for all pilot holes. To this end, the technician must possess significant knowledge regarding various pressures and angles necessary to achieve an acceptable Gap band under these conditions. Moreover, an unexpected flexing of the material can attribute to defective countersunk pilot holes during formation of the countersink.

Accordingly, it is desirable to provide a fixture for working an aircraft component and a method for the same. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of ribs for working an aircraft component having an aircraft component surface, various non-limiting embodiments of fixtures for the same, and various non-limiting embodiments of methods for the same, are disclosed herein.

In one non-limiting embodiment, the rib includes, but is not limited to, a rib surface configured to receive the aircraft component. The rib surface is also configured to be in abutting contact with at least a portion of the aircraft component surface. The rib further includes, but is not limited to, an extension extending away from the rib and configured to couple to a worksurface. Orientation of the rib is configured to be adjustable relative to the worksurface for improving working of the aircraft component.

In another non-limiting embodiment, the fixture includes, but is not limited to, a mount defining an aperture and configured to be coupled to a worksurface. The fixture further includes, but is not limited to, a rib. The rib includes, but is not limited to, a rib surface configured to receive the aircraft component. The rib surface is also configured to be in abutting contact with at least a portion of the aircraft component surface. The rib further includes, but is not limited to, an extension extending away from the rib and configured to be received by the aperture to couple to rib to the mount. Orientation of the rib is configured to be adjustable relative to the worksurface for improving working of the aircraft component In another non-limiting embodiment, the method includes, but is not limited to, providing the fixture including a rib. The rib includes, but is not limited to, a rib surface configured to be in abutting contact with at least a portion of the aircraft component surface and an extension extending away from the rib. The method further includes, but in not limited to, coupling the extension to a worksurface. The method further includes, but in not limited to, disposing the aircraft component on the rib surface.

BRIEF DESCRIPTION OF THE DRAWINGS

The present invention will hereinafter be described in conjunction with the following drawing figures, wherein like numerals denote like elements.

FIG. 3 is a perspective view illustrating a non-limiting embodiment of a rib of the fixture of FIG. 1;

FIG. 4 is a perspective view illustrating a non-limiting embodiment of a collet of the fixture of FIG. 1;

FIG. 5 is a perspective view illustrating another non-limiting embodiment of a collet of the fixture of FIG. 1;

FIG. 6 is another perspective view illustrating the non-limiting embodiment of the collet of FIG. 5;

DETAILED DESCRIPTION

Figure 1:
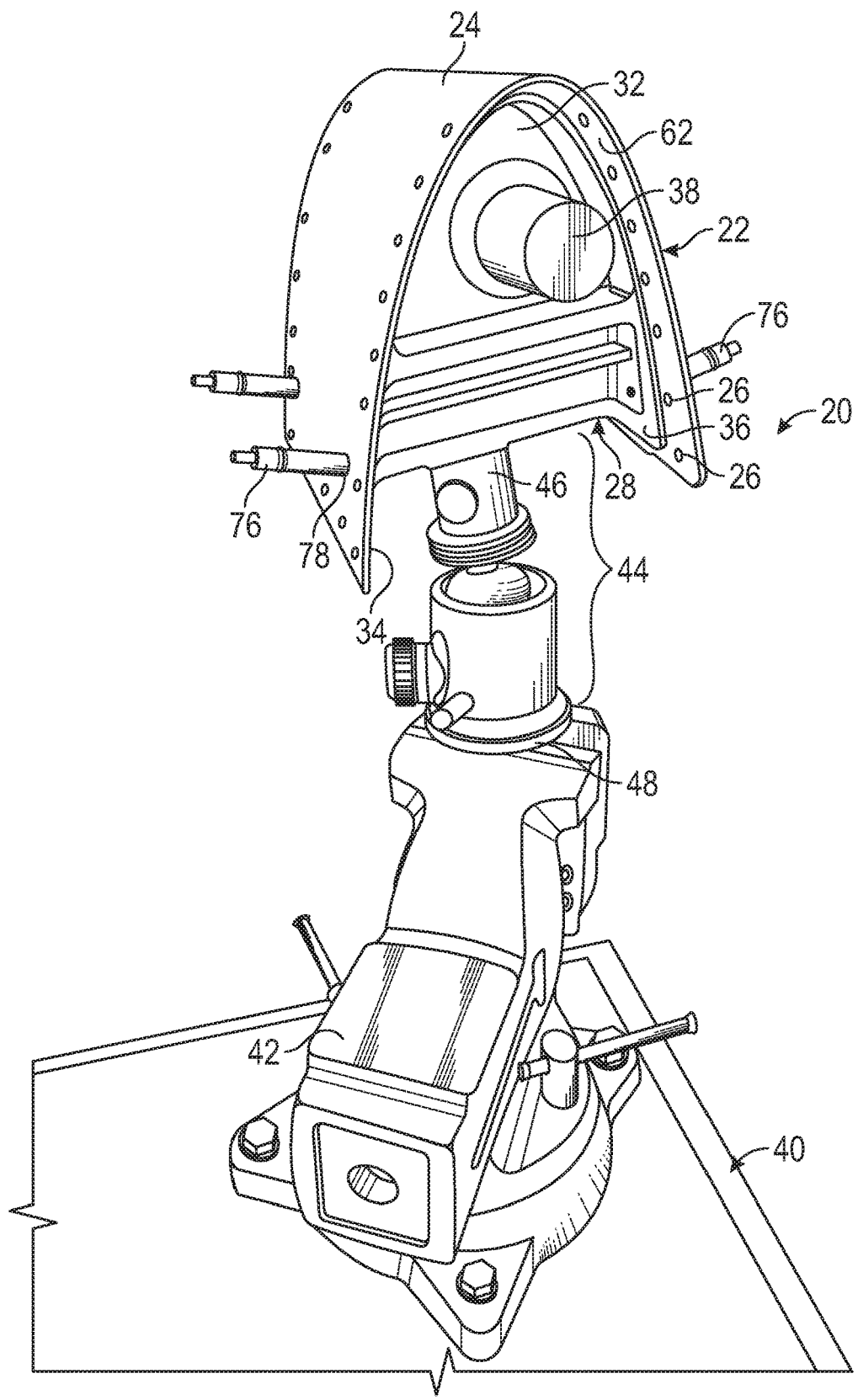
FIG. 1 is a perspective view illustrating a non-limiting embodiment of a fixture for working an aircraft component.

The following detailed description is merely exemplary in nature and is not intended to limit the fixtures or the methods as claimed. Furthermore, there is no intention to be bound by any theory presented in the preceding background or the following detailed description. It should be understood that throughout the drawings, corresponding reference numerals indicate like or corresponding parts and features.

A fixture for working an aircraft component is taught herein. In an exemplary embodiment, the aircraft component is a Gap band for a wing of an aircraft. The Gap band includes 34 pilot holes utilized for attachment to the aircraft. However, it will be appreciated that more or fewer pilot holes may be employed in any particular implementation. The Gap band include an apex having a curved shape. Prior to attachment to the aircraft, each of the pilot holes are countersunk. The fixture includes a rib configured to receive the Gap band. The fixture includes a rib surface having an upper portion. The upper portion has a curved shape that cooperates with the apex of the Gap band such that the Gap band can be sufficiently supported by the fixture. The rib surface has a generally U-shaped or V-shaped configuration.

In this exemplary embodiment, the fixture further includes a mount configured to couple the rib to the worksurface. The rib further includes three extensions with each of the extensions extending away from the rib in different directions. The mount is configured to receive one of the extensions for coupling the rib to a worksurface. The rib may be a unitary component with the rib surface and the extensions integrally formed from a polymeric material. A user utilizing the rib for working the Gap band may select one of the extensions to couple to the mount based on the user's preferences relating to ergonomics and ability to form defect-free countersunk pilot holes. The extension includes an extension surface having a dimple for minimizing movement of the rib relative to the mount.

In this exemplary embodiment, the rib surface extends to a perimeter with the perimeter extending distally about the rib surface. The rib defines a groove extending about the rib surface adjacent the perimeter with the groove extending to a groove surface. The groove extends transverse relative to the rib surface such that the groove surface is parallel to the rib surface. The groove is utilized as a countersink stop during forming of the countersink for the pilot hole by a user. The Gap band is disposed on the rib surface with the pilot holes aligned adjacent to the groove such that when a user is forming the countersink for the pilot holes, the countersink extends to the groove surface, but not beyond the groove surface. The groove improves the repeatability of forming the countersink thereby decreasing the formation of a defective Gap band.

In this exemplary embodiment, the rib surface defines four rib surface holes configured to receive a fastener for coupling the Gap band to the rib. The Gap band defines four aircraft component holes utilized for coupling the Gap band to the fixture by the fastener. The fastener is disposed through each of the four aircraft component holes and into the corresponding rib surface holes for coupling the Gap band to the rib surface. The rib surface holes permit the temporary securing of the Gap band to the rib surface for minimizing movement and/or flexing of the Gap band during working of the Gap band.

A greater understanding of the fixture described above and of the method for working an aircraft component utilizing the fixture may be obtained through a review of the illustrations accompanying this application together with a review of the detailed description that follows.

FIG. 1 is a perspective view illustrating a non-limiting embodiment of a fixture 20 for working an aircraft component 22. The aircraft component 22 may be any component configured to be coupled to an aircraft, such as a wing of the aircraft. In various embodiments, the aircraft component 22 is further defined as a Gap band for the wing of the aircraft. However, it is to be appreciated that the aircraft component 22 may be any other component of an aircraft. The aircraft component 22 may include an aircraft component surface 62. The fixture 20 is configured to receive the aircraft component 22 and be in abutting contact with the aircraft component surface 62. The aircraft component 22 may include an apex 24 having a curved shape. In embodiments, the aircraft component surface 62 has a non-linear configuration, such as having a generally U-shape configuration. However, it is to be appreciated that any the aircraft component surface 62 can have any non-linear configuration.

The aircraft component 22 may define a pilot hole 26 utilized for coupling the aircraft component 22 to the aircraft. The pilot hole 26 may be formed by any process known in the art for forming holes, such as by boring or stamping. The aircraft component 22 may define any number of pilot holes 26 so long as the integrity of the aircraft component 22 is maintained. In certain embodiments, the aircraft component 22 defines 34 pilot holes 26. The term "working" may include any process known in the art relating to the manufacturing, development, preparation, fabrication, maintenance, or installation of the aircraft component 22. In certain embodiments, the term "working" includes forming a countersink for the pilot hole 26.

Figure 2:
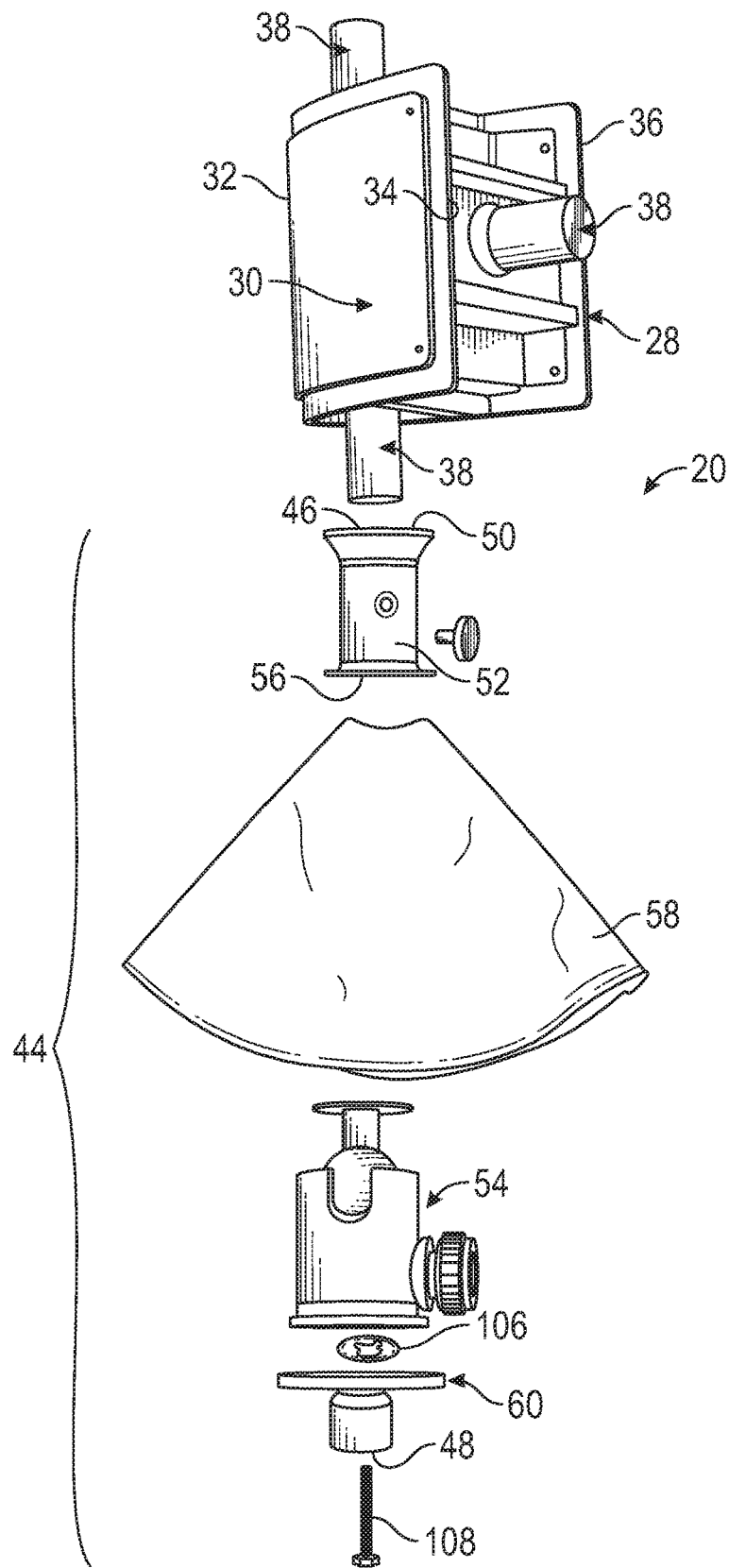
FIG. 2 is an exploded perspective view illustrating a non-limiting embodiment of the fixture of FIG. 1.

FIG. 2 is an exploded perspective view illustrating a non-limiting embodiment of the fixture of FIG. 1. With continuing reference to FIG. 1, the fixture 20 includes a rib 28 configured to receive the aircraft component 22. The rib 28 includes a rib surface 30 configured to be in abutting contact with at least a portion of the aircraft component surface 62. In certain embodiments, the rib surface 30 is configured to substantially match the non-linear configuration of the aircraft component surface 62 and receive the aircraft component 22. The phrase "substantially match" as utilized herein means that at least 50%, alternatively at least 60%, alternatively at least 70%, alternatively at least 80%, or alternatively at least 90% of the area of the rib surface 30 is in abutting contact with the aircraft component surface 62.

In embodiments, the rib surface 30 has an upper portion 32 extending to a first lower portion 34 and a second lower portion 36. The upper portion 32 may be spaced from the first lower portion 34 and the second lower portion 36. The upper portion 32 may have a curved shaped. The curved shape of the upper portion 32 may be cooperate with the apex 24 of the aircraft component 22 such that the aircraft component 22 can be in abutting contact with the rib 28 and sufficiently supported by the fixture 20. The rib 28 further includes an extension 38 extending away from the rib 28. The extension 38 is configured to couple to a worksurface 40 as shown in FIG. 1. The worksurface 40 may include a vice 42. The extension 38 may be directly or indirectly coupled to the vice 42. In certain embodiments, the extension 38 is indirectly coupled to vice 42.

With continuing reference to FIGS. 1 and 2, in exemplary embodiments, the fixture 20 further includes a mount 44 configured to be coupled to the worksurface 40. The mount 44 has a first mount end 46 and a second mount end 48 spaced from the first mount end 46. The mount 44 defines an aperture 50 adjacent the first mount end 46. The mount 44 is coupled to the worksurface 40 adjacent the second mount end 48. The aperture 50 is configured to receive the extension 38 of the rib 28. In some embodiments, the mount 44 includes a collet 52 adjacent the first mount end 46. The collet 52 may define the aperture 50. The mount 44 further includes a base 54 adjacent the second mount end 48. The base 54 may be removably coupled to the collet 52. The collet 52 may define an opening 56 opposite the aperture 50 and configured to receive the base 54 for coupling the collet 52 to the base 54. In embodiments, the mount 44 further includes a shielding component 58 overlying the base 54 for minimizing exposure of the base 54 to contaminants. In non-limiting embodiments, the mount 44 further includes a connector 60 removably coupled to the mount 44 adjacent the second mount end 48. The connector 60 is configured to be coupled to the worksurface 40 for coupling the mount 44 to the worksurface 40 as shown in FIG. 1. In an exemplary embodiment, the rib 28 is directly coupled to the collet 52, the collet 52 is directly coupled to the base 54, the shielding component 58 is overlying the base 54, the base 54 is directly coupled to the connector 60, and the connector 60 is directly coupled to the vice 42 of the worksurface 40. The orientation of the rib 28 is configured to be adjustable relative to the worksurface 40 for improving working of the aircraft component 22. For example, orientation of the extension 38 relative to the aperture 50 can provide a user adjustability of the rib 28 relative to the worksurface 40. A user utilizing the rib 28 for working the aircraft component 22 may select an orientation of the extension 38 based on the user's preferences relating to ergonomics and ability to form defect-free countersunk pilot holes.

FIG. 3 is a perspective view illustrating a non-limiting embodiment of the rib 28 of the fixture 20 of FIG. 1. In certain embodiments, the rib surface 30 has a generally U-shaped configuration. The rib 28 may include three of the extensions 38 with each of the extensions 38 extending away from the rib 28 in different directions. The extension 38 may include an extension surface 66 having a dimple or one or more grooves for minimizing movement of the rib 28 relative to the mount 44. The rib 28 may be a unitary component with the rib surface 30 and the extension 38 integrally formed from a polymeric material. Non-limiting examples of suitable polymeric materials include acrylonitrile butadiene styrene (ABS), acrylonitrile styrene acrylate (ASA), and polyetherimide (PEI). As introduced above, the orientation of the rib 28 is configured to be adjustable relative to the worksurface 40 for improving working of the aircraft component 22. For example, selection of the extension 38 to be coupled to the collet 52 can provide a user adjustability of the rib 28 relative to the worksurface 40. A user utilizing the rib 28 for working the aircraft component 22 may select one of the extensions 38 to couple to the collet 52 based on the user's preferences relating to ergonomics and ability to form defect-free countersunk pilot holes.

With continuing reference to FIG. 3, in embodiments, the rib surface 30 extends to a perimeter 68. The perimeter 68 may extend distally about the rib surface 30. The rib 28 may define a groove 70 extending about the rib surface 30 adjacent the perimeter 68. However, it is to be appreciated that the groove 70 may be defined at any position within the rib surface 30. In embodiments, the groove 70 extends to a groove surface 72. The groove 70 may extend transverse relative to the rib surface 30 such that the groove surface 72 may be parallel to the rib surface 30. The groove 70 may be utilized as a countersink stop during forming of the countersink for the pilot hole 26 by a user. For example, the aircraft component 22 may be disposed on the rib surface 30 with the pilot holes 26 aligned adjacent to the groove 70 such that when a user is forming the countersink for the pilot holes 26, the countersink may extend to the groove surface 72, but not beyond the groove surface 72. The groove 70 improves the repeatability of forming the countersink thereby decreasing the formation of defective aircraft components.

With continuing reference to FIG. 3, in embodiments, the rib surface 30 may define a rib surface hole 74 configured to receive a fastener 76 (see FIG. 1) for coupling the aircraft component 22 to the rib 28. The fastener 76 may include a deco-type fastener. With reference back to FIG. 1, the aircraft component 22 may define an aircraft component hole 78 utilized for coupling the aircraft component 22 to the fixture 20 by the fastener 76. The aircraft component 22 may define any number of aircraft component holes 78 so long as the aircraft component 22 is secured to the rib 28. In certain embodiments, the aircraft component 22 defines four aircraft component holes 78. The fastener 76 may be disposed through the aircraft component hole(s) 78 and into the rib surface hole 74 for coupling the aircraft component 22 to the rib surface 30. The rib surface hole(s) 74 permits the temporary securing of the aircraft component 22 to the rib surface 30 for minimizing movement and/or flexing of the aircraft component 22 during working of the aircraft component 22. Any or each of the aircraft component hole 78 that cooperates with the rib surface hole 74 may be utilized to couple the aircraft component 22 to the aircraft along with the pilot hole 26.

FIG. 4 is a perspective view illustrating a non-limiting embodiment of the collet 52 of the fixture 20 of FIG. 1. In this embodiment, the collet 52 is referred to as a first collet 80. The first collet 80 may define the opening 56 opposite the aperture 50. The opening 56 may be configured to receive the base 54 for removably coupling the first collet 80 to the base 54. In embodiments, the opening 56 is treaded. The first collet 80 may include a pin 82 configured to protrude into the aperture 50 and apply a securing force to the extension 38. The pin 82 may cooperate with the aperture 50 of first collet 80 and the extension 38 of the rib 28 for securing the rib 28 to the first collet 80. It is to be appreciated that the first collet 80 may include more than one pin 82. The pin 82 may cooperate with the dimpled or textured extension surface 66 to minimize rotation of the extension 38 relative to the first collet 80. The first collet 80 may be formed from a metal-containing material. Non-limiting examples of suitable metal-containing materials include steel and aluminum such as, maraging steel, 15-5 stainless steel, and AlSi10Mg aluminum.

FIGS. 5 and 6 are perspective views illustrating another non-limiting embodiment of the collet 52 of the fixture 20 of FIG. 1. In this embodiment, the collet 52 is referred to as a second collet 84. The second collet 84 may define the opening 56 opposite the aperture 50. The opening 56 may be configured to receive the base 54 for removably coupling the first collet 80 to the base 54. In exemplary embodiments, the opening 56 is treaded. The second collet 84 may include a finger 86 defined by a slit 88 configured to permit deflection of the second collet 84 with a bias toward the aperture 50 and apply a force against the extension 38. The finger 86 may cooperate with the aperture 50 of second collet 84 and the extension 38 of the rib 28 for securing the rib 28 to the first collet 80. It is to be appreciated that the second collet 84 may include more than one finger 86. The second collet 84 may include a detent or protrusion 90 that may cooperate with the dimpled extension surface 66 to minimize rotation of the extension 38 relative to the second collet 84. The second collet 84 may be formed from a metal-containing material. Non-limiting examples of suitable metal-containing materials include steel and aluminum such as, maraging steel, 15-5 stainless steel, and AlSi10Mg aluminum.

Figure 7:
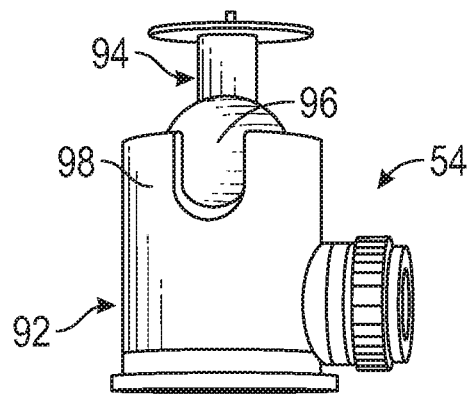
FIG. 7 is a perspective view illustrating a non-limiting embodiment of a base of the fixture of FIG. 1.

FIG. 7 is a perspective view illustrating a non-limiting embodiment of the base 54 of the fixture 20 of FIG. 1. The base 54 includes a stationary portion 92 and an adjustable portion 94 moveably coupled to the stationary portion 92. In certain embodiments, the base 54 includes a ball and socket joint with the adjustable portion 94 including a ball 96 and the stationary portion 92 including a socket 98. The ball 96 cooperates with the socket 98 for permitting movement of the adjustable portion 94 relative to the stationary portion 92. The adjustable portion 94 may be removably coupled to the collet 52. The stationary portion 92 may be removably coupled to the connector 60. As introduced above, the orientation of the rib 28 is configured to be adjustable relative to the worksurface 40 for improving working of the aircraft component 22. For example, orientation of the adjustable portion 94 relative to the stationary portion 92 can provide a user adjustability of the rib 28 relative to the worksurface 40. A user utilizing the rib 28 for working the aircraft component 22 may select an orientation of the adjustable portion 94 based on the user's preferences relating to ergonomics and ability to form defect-free countersunk pilot holes.

Figure 8:
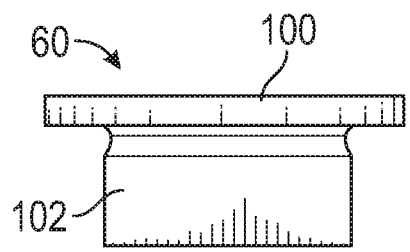
FIG. 8 is a perspective view illustrating a non-limiting embodiment of a connector of the fixture of FIG. 1.
Figure 9:
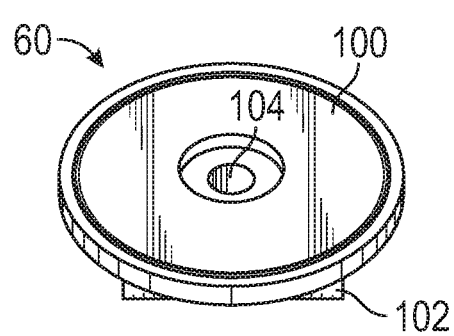
FIG. 9 is another perspective view illustrating the non-limiting embodiment of the connector of FIG. 8.
Figure 10:
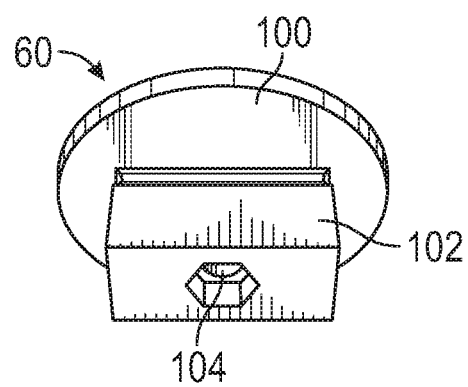
FIG. 10 is another perspective view illustrating the non-limiting embodiment of the connector of FIG. 8.
Figure 11:
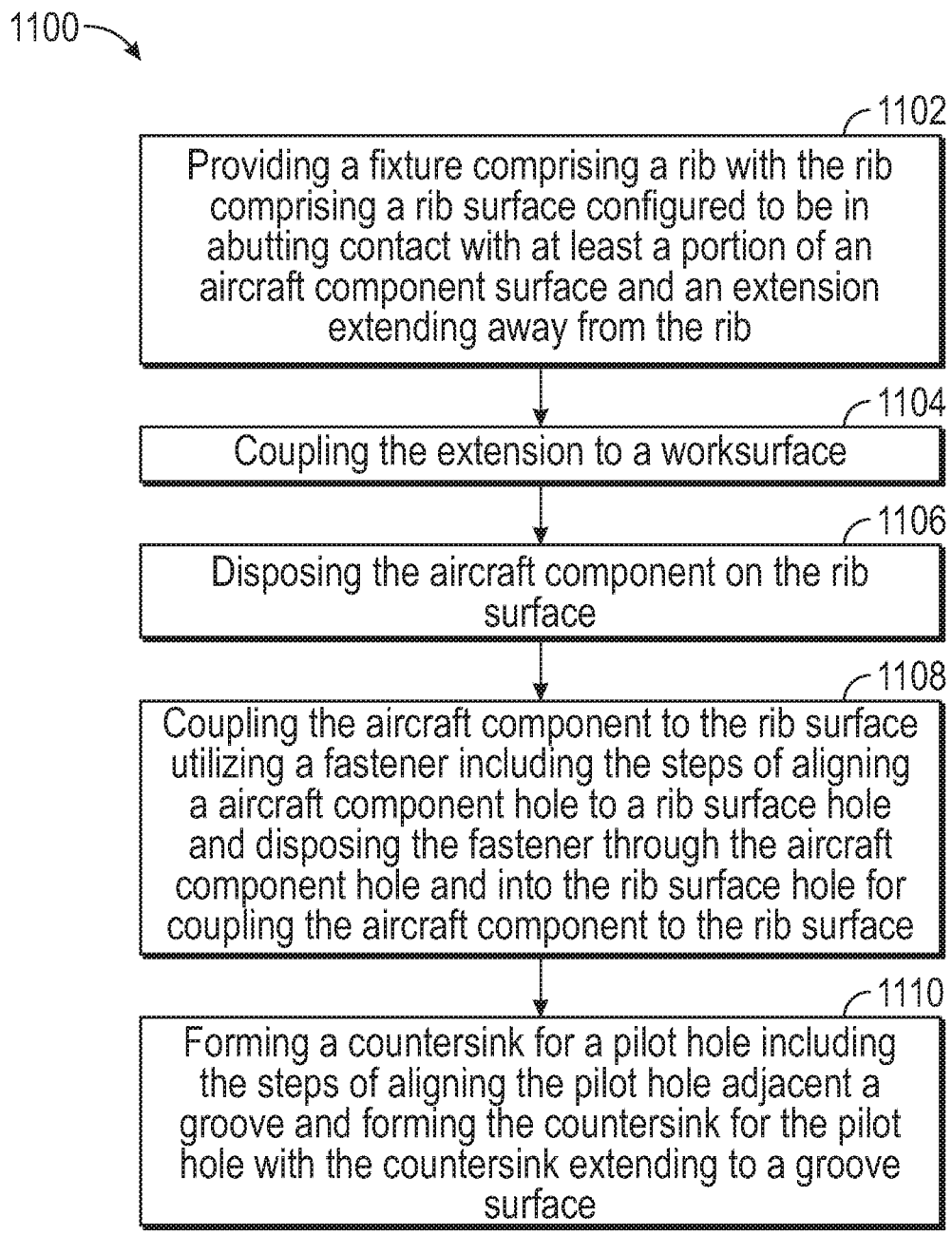
FIG. 11 is a flow chart illustrating a non-limiting embodiment of a method for working the aircraft component utilizing the fixture of FIG. 1

FIGS. 8, 9, and 10 are perspective views illustrating a non-limiting embodiment of the connector 60 of the fixture 20 of FIG. 1. The connector 60 may be configured to be received by the vice 42 for coupling the mount 44 to the worksurface 40. The connector 60 may include a body 100 and a handle 102 extending from the body 100. The body 100 may be coupled to the base 54 of the mount 44 and the handle 102 may be received by the vice 42. The connector 60 may define a bore 104 extending through the body 100 and the handle 102. A spacer 106 may be disposed between the body 100 and the mount 44 (see FIG. 2). A screw 108 may be disposed through the bore 104 and the spacer 106 to the mount 44 to couple the connector 60 to the mount 44 (see FIG. 2).

With reference back to FIGS. 1, 2, and 3, in other embodiments, the fixture 20 for working the aircraft component 22 defines a pilot hole 26. The fixture 20 may include a rib 28 configured to receive the aircraft component 22. The rib 28 may include a rib surface 30 extending to the perimeter 68. The rib 28 may define the groove 70 extending about the rib surface 30 adjacent the perimeter 68. The groove 70 may be configured to align adjacent the pilot hole 26 when the rib 28 receives the aircraft component 22. In these embodiments, it is to be appreciated that the rib 28 may have any configuration known in the art for supporting aircraft component 22 so long as the groove 70 may be configured to align adjacent the pilot hole 26.

With continuing reference to FIGS. 1-10, FIG. 11 is a flow chart illustrating a non-limiting embodiment of a method 1100 for working the aircraft component 22 utilizing the fixture 20 of FIG. 1. The method includes the step 1102 of providing the fixture including the rib 28. The rib 28 includes the rib surface 30 configured to be in abutting contact with at least a portion of the aircraft component surface 62. The rib 28 further includes the extension 38 extending away from the rib 28. The method further includes the step 1104 of coupling the extension 38 to the worksurface 40. The method further includes the step 1106 of disposing the aircraft component 22 on the rib surface 30.

In embodiments, the method further includes adjusting the rib 28 relative to the worksurface 40 for improving working of the aircraft component 22. The step of adjusting the rib 28 relative to the worksurface 40 may include the sub-steps of selecting an orientation of the extension 38 relative to the aperture 50, selecting one of the extensions 38 to couple to the collet 52, and selecting an orientation of the adjustable portion 94 relative to the stationary portion 92.

In embodiments, the method further includes the step 1108 of coupling the aircraft component 22 to the rib surface 30 utilizing the fastener 76. The step of coupling the aircraft component 22 to the rib surface 30 utilizing the fastener 76 may include the sub-steps of aligning the aircraft component hole 78 to the rib surface hole 74 and disposing the fastener 76 through the aircraft component hole 78 and into the rib surface hole 74 for coupling the aircraft component 22 to the rib surface 30.

In embodiments, the method further includes the step 1110 of forming a countersink for the pilot hole 26. The step of countersinking the pilot hole 26 may include the sub-steps of aligning the pilot hole 26 adjacent the groove 70 and forming the countersink for the pilot hole 26 with the countersink extending to the groove surface 72. The step of forming the countersink for the pilot hole 26 may include the sub-steps of locating a tool on the pilot hole 26, activating the tool, and applying pressure to the pilot hole 26 with the tool to form the countersunk pilot hole.

In embodiments, the method further includes removing the aircraft component 22 from the fixture 20. The step of removing the aircraft component 22 from the fixture 20 may include the sub-steps of removing the fastener 76 from the rib surface hole 74 and the aircraft component hole 78 and separating the aircraft component 22 and the fixture 20 from each other.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A fixture for working an aircraft component having an aircraft component surface, the fixture comprising:
   a mount configured to be coupled to a worksurface and having a first mount end and a second mount end spaced apart from the first mount end, the mount comprising:
   a collet that includes the first mount end, defines an aperture, and defines an opening opposite the aperture; and
   a base that is disposed adjacent to the second mount end, wherein the opening receives the base for coupling the collet to the base, and the base is removably coupled to the collet; and
   a rib comprising; a rib surface configured to receive the aircraft component and the rib surface configured to be in abutting contact with at least a portion of the aircraft component surface, wherein the rib surface is arched and has an upper portion with an apex that has a curved shape, wherein the rib surface extends to a perimeter of the rib surface, the rib defines an unoccupied groove surrounding the rib surface adjacent the perimeter, and the groove extends to a groove surface that is substantially parallel to the rib surface, and an extension extending away from the rib and configured to be received by the aperture to couple to rib to the mount;

wherein orientation of the rib is configured to be adjustable relative to the worksurface for improving working of the aircraft component.

2. The fixture of claim 1, wherein the base comprises a stationary portion and an adjustable portion moveably coupled to the stationary portion and the adjustable portion is removably coupled to the collet.

3. The fixture of claim 1, wherein the mount further comprises a shielding component overlying the base for minimizing exposure of the base to contaminants.

4. The fixture of claim 1, wherein the mount further comprises a connector that includes the second mount end, wherein the connector is configured to be coupled to the worksurface for coupling the mount to the worksurface.

5. The fixture of claim 4, wherein the worksurface comprises a vice and the connector is configured to be received by the vice for coupling the mount to the worksurface.

6. The fixture of claim 1, wherein the rib further includes a second extension and a third extension that each extend away from the rib.

7. The fixture of claim 6, wherein the extension, the second extension, and the third extension extend away from the rib each in different directions relative to one another.

8. The fixture of claim 7, wherein each of the extension, the second extension, and the third extension are independently configured to be received by the aperture to couple the rib to the mount.

9. A method of utilizing the fixture of claim 1 for working the aircraft component having the aircraft component surface, the method comprising:

providing the fixture of claim 1 comprising the rib with the rib comprising the rib surface and the extension; and disposing the aircraft component on the rib surface.

10. The method of claim 9, further comprising coupling the aircraft component to the rib surface utilizing a fastener.

11. The method of claim 10, wherein the aircraft component defines an aircraft component hole, the rib surface defines a rib surface hole, and the step of coupling the aircraft component to the rib surface utilizing the fastener comprises:

aligning the aircraft component hole to the rib surface hole; and disposing the fastener through the aircraft component hole and into the rib surface hole for coupling the aircraft component to the rib surface.

12. The method of claim 9, wherein the aircraft component defines a pilot hole and the method further comprises forming a countersink for the pilot hole.

13. The method of claim 12, wherein the step of countersinking the pilot hole comprises:

aligning the pilot hole adjacent the groove; and forming the countersink for the pilot hole with the countersink extending to the groove surface.

\* \* \* \* \*